United States Patent [19]

Crosby et al.

[11] Patent Number: 4,584,622
[45] Date of Patent: Apr. 22, 1986

[54] TRANSIENT VOLTAGE SURGE SUPPRESSOR

[75] Inventors: John J. Crosby; John J. Napiorkowski, both of Cape Elizabeth, Me.

[73] Assignee: GTE Products Corporation, Stamford, Conn.

[21] Appl. No.: 629,288

[22] Filed: Jul. 9, 1984

[51] Int. Cl.⁴ .............................................. H02H 9/04
[52] U.S. Cl. ...................................... 361/56; 361/111
[58] Field of Search .................. 361/56, 91, 111, 110, 361/113, 118, 119; 333/12, 17.6, 202

[56] References Cited

U.S. PATENT DOCUMENTS 4,152,743  5/1979  Comstock ...................... 361/111 X
4,259,705  3/1981  Stifter ................................ 361/56

Primary Examiner—A. D. Pellinen
Assistant Examiner—H. L. Williams
Attorney, Agent, or Firm—James Theodosopoulos

[57] ABSTRACT

A transient voltage surge suppressor for an AC powerline comprises two semiconductor voltage limiting devices before a low pass LC filter and a third semiconductor voltage limiting device after the filter. The suppressor can be plugged into a 120 volt receptacle for protection of sensitive electronic equipment.

3 Claims, 1 Drawing Figure

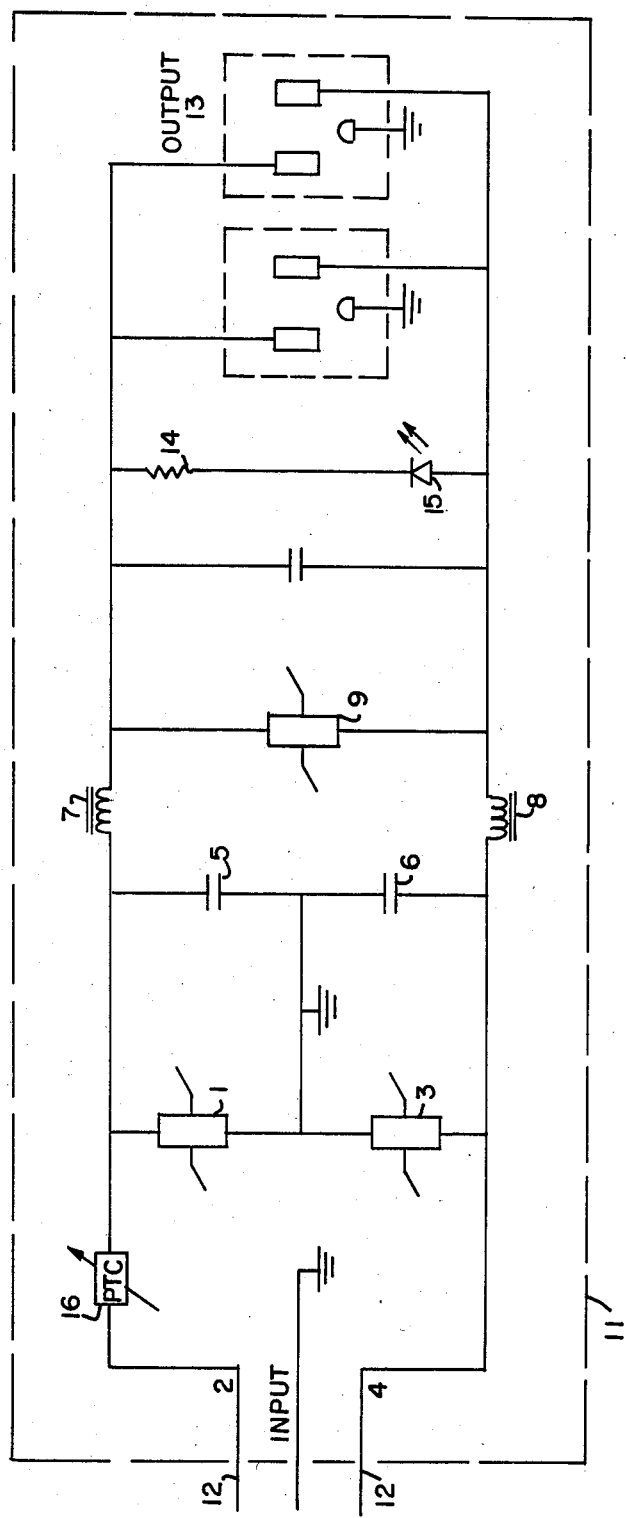

TRANSIENT VOLTAGE SURGE SUPPRESSOR

This invention concerns suppressors for use with AC power lines.

The proliferation in the use of sensitive electronic equipment such as personal computers and video tape recorders has resulted in the desirability of simple plug-in suppressors to protect such equipment from voltage surges, spikes and transients. This invention provides such a suppressor.

A suppressor in accordance with this invention comprises two semiconductor voltage limiting devices before an RFI/EMI filter and one after. This arrangement protects against two possible voltage transient conditions not provided for in prior art units. It also increases the effective speed of the suppression circuit due to the location of the filter in the circuit. The voltage limiting devices may be metal oxide varistors, PNPN junction devices (surgistors) or avalanche junction devices (transorbs).

The drawing is a schematic of an example of a suppressor in accordance with this invention. The suppressor in the drawing comprises two metal oxide varistors at the input end of the circuit, varistor 1 between line 2 and ground, and varistor 3 between neutral 4 and ground. Varistors 1 and 3 suppress any incoming voltage surges referenced from line 2 to ground or from neutral 4 to ground, respectively, by reducing impedance and maintaining an established clamping voltage across each varistor. This arrangement also will limit incoming surges referenced from line 2 to neutral 4 to approximately the sum of the rated clamping voltages of varistors 1 and 3, thus acting as a first stage of transient voltage suppression.

In parallel with varistors 1 and 3 respectively, are capacitors 5 and 6 which are followed by two choke coils, choke 7 in series with line 2, and choke 8 in series with neutral 4. Following chokes 7 and 8 are varistor 9, connected between line 2 and neutral 4, and capacitor 10, in parallel with varistor 9.

Capacitors 5, 6 and 10 along with chokes 7 and 8 form a low pass filter for suppression of radio frequency interference/electromagnetic interference (RFI/EMI) which might interfere with the operation of electronic equipment. This low pass LC filter also will slow the rise time of an incoming fast rising surge, allowing varistor 9 to respond and suppress the surge voltage before a damaging voltage is present at the output. Varistor 9 acts as a second stage of voltage surge suppression, limiting any surge to the clamping voltage of varistor 9. Thus, any excessive voltage presented at the input of the circuit will be limited to the varistor clamping voltage at the output within a short enough period of time to protect electronic equipment connected to the output.

For plug-in purposes, this circuit could be contained within enclosure 11 having prongs 12 for plugging into the usual 120 volt electrical receptacle, and having receptacle 13 for plugging electronic equipment thereinto. It may be desirable to place one or more PTC protectors 16 in series with the voltage limiting devices in order to provide protection against a long duration surge. PTC protector 16 limits current by increasing its resistance with an increase in its temperature.

It may also be desirable to place a resistor 14 and light emitting diode 15 in the circuit to indicate the presence of voltage at the output. In the event of an open fuse or tripped circuit breaker in the electrical supply to the input, the LED would be extinguished.

We claim:

1. A voltage surge suppressor for AC power lines comprising a circuit comprising: an input consisting of a line, a neutral and a ground; a first varistor connected between the line and ground; a second varistor connected between the neutral and ground; a first capacitor in parallel with the first varistor; a second capacitor in parallel with the second varistor; a first choke connected in series with the line after the first varistor and first capacitor; a second choke connected in series with the neutral after the second varistor and second capacitor; a third varistor connected between the line and neutral after the two chokes; a third capacitor in parallel with the third varistor and an output to which electronic equipment can be connected.

2. The suppressor of claim 1 wherein the circuit includes a light emitting diode to indicate when electrical power is supplied to the input.

3. The suppressor of claim 1 wherein the circuit includes a PTC protector in series with one of the varistors.

* * * * *